United States Patent [19]

Okamoto

[11] Patent Number: 5,394,507
[45] Date of Patent: Feb. 28, 1995

[54] HEATED TUBE WITH A BRAIDED ELECTRIC HEATER

[75] Inventor: Hiromu Okamoto, Izumisano, Japan

[73] Assignee: Tokyo Kogyo Boyeki Shokai, Ltd., Tokyo, Japan

[21] Appl. No.: 64,278

[22] Filed: May 20, 1993

Related U.S. Application Data

[62] Division of Ser. No. 752,860, Aug. 30, 1991, Pat. No. 5,245,161.

[30] Foreign Application Priority Data

Aug. 31, 1990 [JP] Japan ................. 2-228058
Aug. 31, 1990 [JP] Japan ................. 2-228059

[51] Int. Cl.⁶ .............................................. H05B 3/56
[52] U.S. Cl. ........................... 392/480; 219/549; 219/535; 338/208; 338/214
[58] Field of Search ............... 219/528, 529, 548, 549, 219/544, 541; 392/472, 480; 29/611; 338/214, 208

[56] References Cited

U.S. PATENT DOCUMENTS

| | | | |
|---|---|---|---|
| 787,047 | 4/1905 | Leonard | 338/208 X |
| 2,758,194 | 8/1956 | Heron | 392/472 |
| 3,757,086 | 9/1973 | Indoe | 338/214 X |
| 4,037,083 | 7/1977 | Leavines | 338/214 X |
| 4,100,673 | 7/1978 | Leavines | 29/611 |
| 4,352,007 | 9/1982 | Baker et al. | 392/472 |
| 4,523,086 | 6/1985 | Eilentropp | 219/549 |
| 4,581,521 | 4/1986 | Grise | 219/549 X |
| 4,816,649 | 3/1989 | Eilentropp | 219/549 |

Primary Examiner—Bruce A. Reynolds
Assistant Examiner—John A. Jeffery
Attorney, Agent, or Firm—Michael N. Meller

[57] ABSTRACT

A heated tube with a electric heater comprising a braid structure of bare strands of resistance wire connected in an arrangement to form a number of resistance circuits in parallel in a zone formed between exposed core portions of an electrical feeder line. The electric heater is braided directly on a tube, or is braided in a flat shape and then wound in a large spiral around a tube and a feeder line with cores having exposed portions arranged along the tube. When power is supplied to the feeder line, the electric heater generates heat at each zone and a fluid flowing through the heated tube is uniformly heated.

3 Claims, 8 Drawing Sheets

PRIOR ART

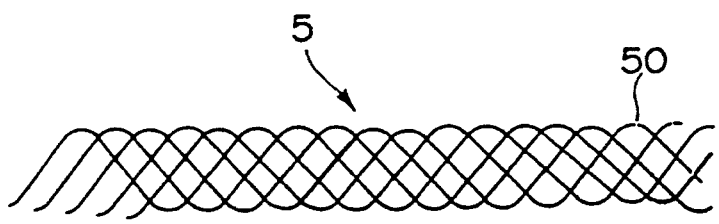
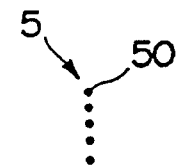
FIG. 3A          FIG. 3B
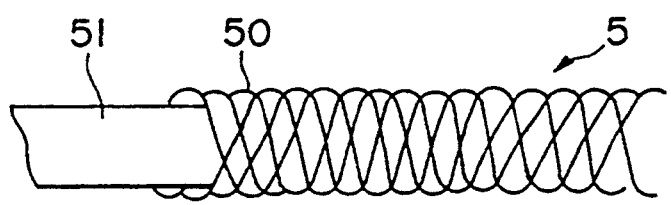
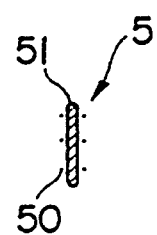
FIG. 4A          FIG. 4B

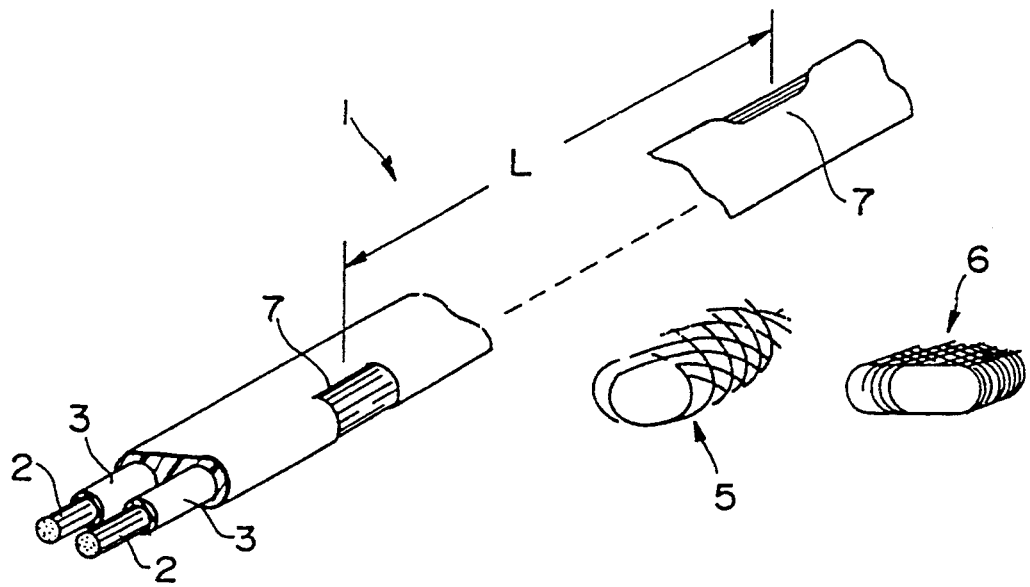
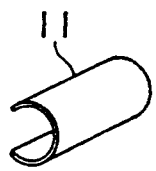 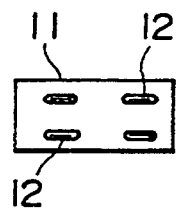 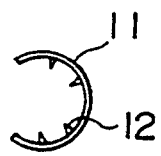
FIG. 7A  FIG. 7B  FIG. 7C
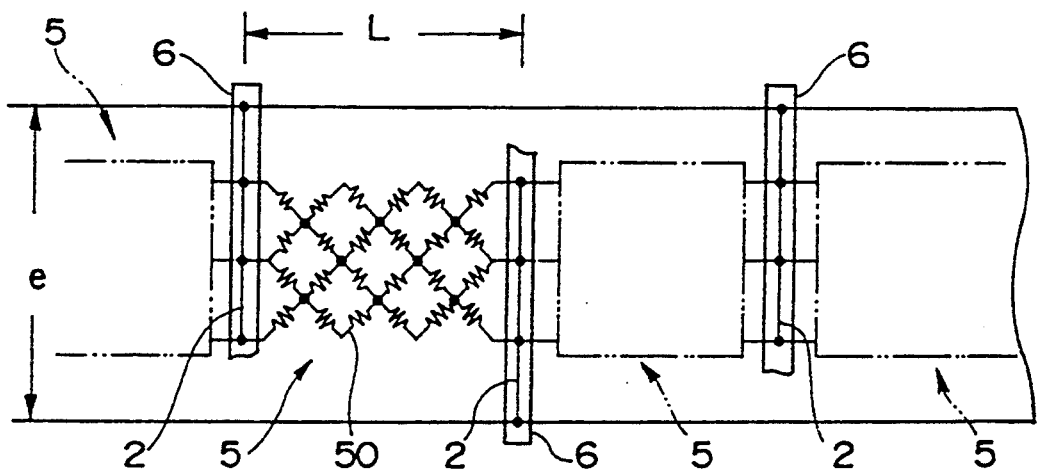
FIG. 8

HEATED TUBE WITH A BRAIDED ELECTRIC HEATER

CROSS-REFERENCES TO RELATED APPLICATIONS

This is a divisional application of U.S. patent application Ser. No. 752,860, filed on Aug. 30, 1991, now U.S. Pat. No. 5,245,161 and relates to an electric heater used to an electric heating cable and a heating tube.

BACKGROUND OF THE INVENTION

Nowadays, transporting high-viscosity oil and the like through pipes, the viscosity of the moving oil has been reduced by electrical-heating of the pipe line in order to improve an efficiency of transportation of oil. According to the prior art, such electrical heating system is constructed, for example, by an electric heating cable consisting of a feeder line and an electric heater, respectively are covered by an inorganic insulating cover material, and a heat retaining material made of calcium silicate and the like, the electric heating cable is laid in straight or helically wound along a longitudinal direction of an oil pipeline, consequently heat loss through the pipe is prevented. According to other example of the prior art, a small-diameter pipe is welded on the oil pipeline and an electric heating cable is placed within the small-diameter pipe using a skin current heating effect in the pipe. It is called a SECT (Skin Effect Current Tracing) Method. Also, such electric heating cables are used to prevent roads, pedestrian sidewalks, and pedestrian crossing bridges in cold regions from freezing and being deposited of snow, or heat buildings. In case that the electric heating cables are installed in roads and sidewalks, the cables are buried in a serpentine configuration under the ground of 50–100 mm in depth and cement or asphalt concrete is cast in the direction of the serpentine cable.

Other than the electric heating cable above, heating tubes have been used in order to sustain heat of the fluid flowing through the tube and control the temperature of the fluid, which heating tubes are made by integrally constructing or assembling a tube, a feeder line, and the electric heater. The heating tube is usually made of a thermal resisting tube of metal or non-metal and a fluid flows therethrough, a feeder line extending along the thermal resisting tube, and an electric heater wound around the assembly of the tube and the feeder line helically or spirally in order to dielectrically cover the tube. Such a heating tube has been employed in, for example, a medical dialyser so as to sustain heat or temperature of the dialysis liquid flowing in the tube at a human temperature. The electric heater used in the electric heating cable and the heating tube generates electrically heat due to Joule effect to heat the target material.

Next, disadvantageous features of the conventional electric heater will be described with reference to FIG. 1 and FIG. 2(A), 2(B), respectively showing the construction of the electric heating cable and a heating tube formed according to the prior art.

As shown in FIG. 1 depicting an electric heating cable, it is constructed by a feeder line 1, two cores 2 of the feeder line 1, insulating covers 3, 4 and 9 made of insulation material, a resistance wire 5 wound around the insulating cover 4 spirally, and a shield 10. The resistance wire 5 is an electric heating means. Ordinarily, a diameter of the resistance wire 5 is AWG (American Wire Gauge) about 36–42. The two cores 2 are developed through an exposed portion 7 formed in the insulation cover 4. The cores 2 and the resistance wire 5 are connected each other at a connection point 8.

Such electric heating cables are attached to, for example, pipes of installations in cold regions. In operation of such electric heating cables, when an AC voltage is impressed to the cores 2, respective resistance wire 5 connected in a zone section between the two adjacent exposed portions 7 generates heat. Owing to the heat of respective heat resistance wires 5, the piping for installations are heated every zone section, so as to prevent a fluid flowing through the piping for installations from freezing.

Another conventional heating tube disclosed in Japan Patent Application Laid-Open No. Sho 56-85352 is shown as FIGS. 2(A) and 2(B).

The conventional heating tube consists of an inner layer of tube 1, a heat generating layer 2, an outer layer of tube 3, an electric heating resin film 22, two tape-like metal foil conductors 23, and a fluoroethylene plastics tape-like protective resin film 24. The metal foil conductors 23 are positioned on the electric heating resin film 22 and they are covered in turn by the protective resin film 24 in a shape of sandwich in order to form a surface heating member 21. The surface heating member 21 is wound around the tube 1 and the heat generating layer 2 is constructed. The assembly of them is covered by a tube outer layer 3.

In general, the electric heating resin film 22 above is constructed by a conductive polymer and the like having a positive thermal coefficient. Ordinarily when a voltage is impressed between the metal foil conductors 23, the higher the temperature rises, the higher the resistance becomes. An increase in the electric resistance causes the current to decrease and accordingly the temperature of the heat generating layer 2 decreases. As a result, the electric heater of this kind belongs to a type of self-control.

Such heating tube has been used, for example, as a medical tube in a medical installation. When AC is impressed to two tape-like metal foil conductor 23, the electric heating resin film 22 is heated. Heat generated by the film 22 warms the tube 1 to heat medical liquid such as dialysis liquid, and medical gas flowing through the tube 1, sustaining them at a fixed temperature.

The conventional electrical heating cable shown in FIG. 1 and described above uses a resistance wire 5 wound around the insulation shield of the feeder line 1 in spiral as an electric heating means. The resistance wire 5 mutually is connected to the core 2 at a junction point 8. When a current is fed to the resistance wire 5, a joule effect happens generating heat. When AC is impressed across the resistance wire generating heat in a certain temperature cycle and the cycle changes or an outside force such as a bending is applied to the resistance wire 5, the wire is apt to be broken thus failing to generate disadvantageously heat in a corresponding zone section. Also, when a current flows through the resistance wire 5, it is continuously heated causing its temperature to rise to a temperature zone of more than 50° C. at which the wire is no longer able to sustain a load. In addition, because the single resistance wire 5 is joined to cores 2 at the junction point 8, it is possible that a bad connection happens at the point 8.

The conventional heating tube shown in FIGS. 2(A) and 2(B) are constructed as self control heaters to generate heat in the heating resin film 22 which has a positive thermal coefficient by impressing AC to two insulated tape-type metal foil conductor 23. Consequently, a stable heat generation is limited in a low temperature zone and it is disadvantageously difficult to obtain a stable generation of heat at a temperature of more than 50° C.

SUMMARY OF THE INVENTION

The electrically heated tube of the present invention comprises a tube, an electrical feed line arranged along the tube consisting of electrically conductive cores each of which is covered by an insulator having exposed portions formed periodically at regular spaced apart intervals to expose each core through each exposed portion and an electric heater having a braided structure which is arranged around the tube and electrically connected to the cores through the exposed portions to form parallel resistance circuits in a zone between exposed portions of the cores. In the case where the heated tube with the electric heater is, for example, connected to the route through which a fluid flows then when the switch is turned on a voltage is impressed to the feeder line and a current is fed to the braided electric heater which is electrically connected to the cores at each of the exposed portions and a Joule heat is generated in the heater. The Joule heat warms the tube which is consequently transmitted to the fluid flowing through the tube for preventing the fluid from freezing or for sustaining a fixed temperature if necessary.

BRIEF DESCRIPTION OF THE DRAWING

FIGS. 3 and 4(A) and 4(B) are views of an embodiment of the present invention;

FIG. 6 is an exploded perspective view of a part of the arrangement shown in FIG. 5;

FIG. 7(A), 7(B) and 7(C) are views of a fixing piece for connecting the electric heater to the feeder line;

FIG. 8 is a schematic diagram of the electric heating cable;

PREFERRED EMBODIMENT

As shown in FIGS. 3 and 4, the electric heater 5 consists of a plurality of strands 50. The strands 50 are naked resistance wires of diameters of about 0.08–0.1 mm. These strands 50 are arranged in a manner of mutual-in-and-out and form a braid. FIGS. "3(A)" and "3(B)" show one being braided of a single strand or a plurality of strands 50 in a shape of band FIGS. "4(A)" and "4(B)" respectively show another one being braided of a single strand or a plurality of strands 50 around an electrically insulating core member 51. Such constructed electric heater 5 is used in various apparatuses as shown in FIGS. 5 to 16.

Figure 1:
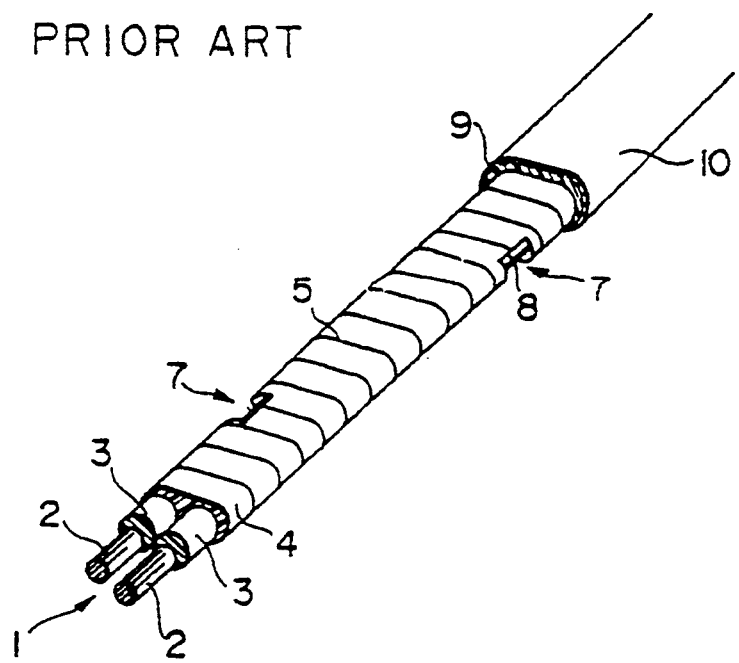
FIGS. 1 and 2(A) and 2(B) are structural views of the conventional electric heating cable and a heating tube.
Figure 2A:
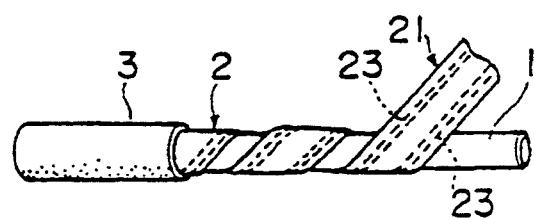
Figure 2B:
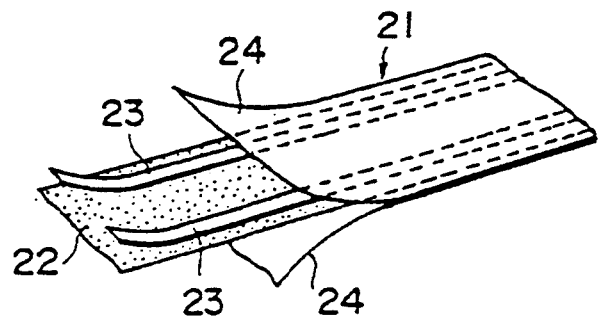
Figure 5:
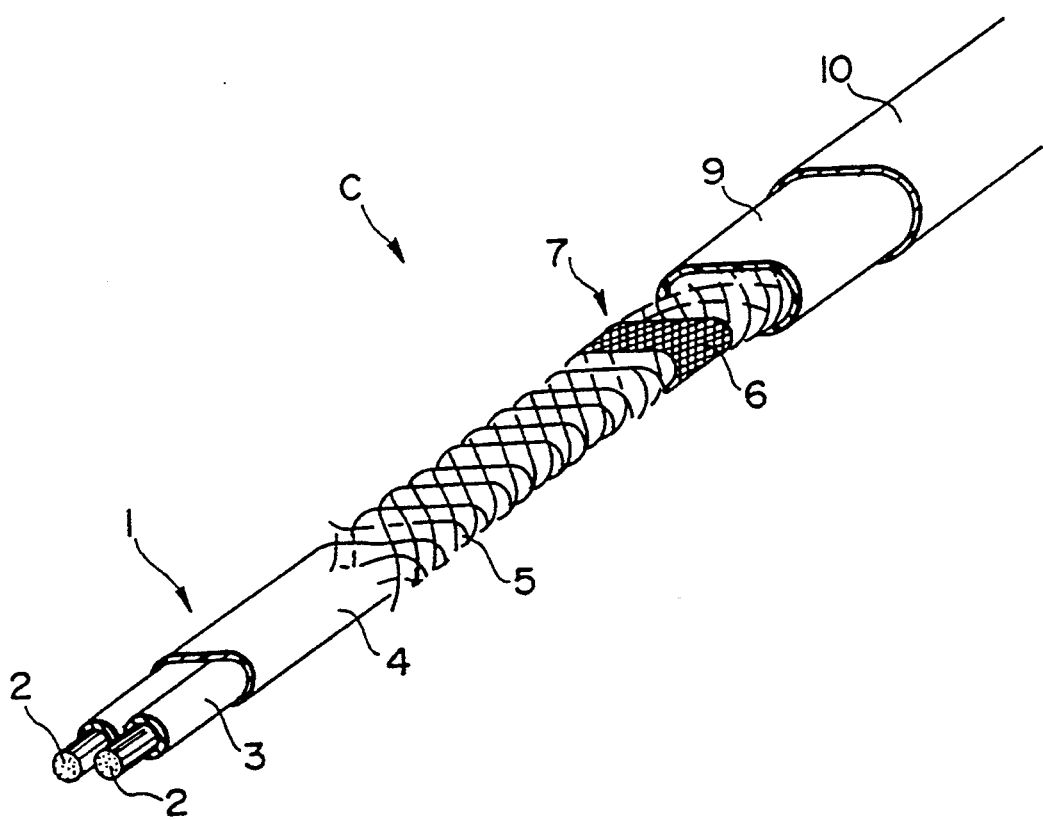
FIG. 5 is a view of the electric heating cable of the first embodiment or application of the present invention.

FIGS. 7(A), 7(B) and 7(C), respectively show views of fastener pieces for joining the electric heater to the feeder line and show the case in which the electric heater of the present invention is applied to the electric heating cable for low and middle temperature (0°–50° C., 50°–120° C.). In FIGS. 5–7, the parts having the corresponding function to those of FIGS. 1 and 2 have the identical reference numerals and some parts will be explained again in detail.

FIG. 5 shows the feeder line 1, two cores 2 of the feeder line 1, an insulator 3 covering the cores 2 and another insulator 4 for both of the insulators 3. The cores 2 may be concentrated strands consisting of high conductive metal such as copper or copper plated with nickel or silver. The insulators 3 and 4 consist of fluoro-ethylene plastics having high heat resistance.

The electric heater 5 according to the present invention has a braided structure of bare strands 50 of resistance wire. A joint 6 has a flat band-shape and braided structure of strands which consist of fine wires made of conductive metal like copper. The exposed portion 7 is formed in each of the insulators 3 and 4 to expose the core 2 and the exposed portion 7 is formed thereon to electrically connect the core 2 at its exposed portion to the electric heater 5. It should be noted that the exposed portion 7 is formed alternately to expose one of the two cores 2 at regular spaced intervals L along the feeder line 1, and a joint 6 with a braided structure is wound over each exposed portion of the cores. The joint 6 connects the electric heater 5 to the cores 2 at respective joint portions 8 by pressing the electric heater 5 of a braid construction to cores 2 coming in contact through a number of points or lines. The heat insulator 9 covers the joint 6 and other elements and the outer shield 10 protects the insulator 9. As described above, an electric heating cable C shown in FIG. 5 consists of the feeder line 1, the electric heater 5, and the arrangement of braided joints.

For example, one manufacturing method of the electric heating cable C above will be explained. First, the core 2 consisting of stranded fine wires made of a conductive metal like silver plated copper covered by the insulator 3. Two of the covered conductors are then placed side by side and covered with insulator 4 and molded with a plastic to make the feeder line 1 with two cores 2. Next, outer portions of the insulators 3 and 4 are cut off in a half-cylindrical shape so the two cores 2 may be alternately exposed at a regular spaced interval L along the feeder line 1. Consequently, the cores are exposed at the cut off portions with a fixed width, and exposed portions 7 are formed. After the formation of the exposed portions 7, the bare strands 50 of resistance wires are braided around the feeder line 1 so that the feeder line 1 may be wrapped in the braided electric heater 5. In order to secure the electrical contact between the electric heater 5 and the two cores 2, the electric heater 5 is bound at the exposed portions with the joints 6 which have a braided structure with a little less width than that of the exposed portion. A fixing member 11 of a C shape as shown in FIGS. 7(A)–7(C)

is applied on the braid of the joint 6 and an open portion of the fixing member 11 is pressed from both sides of the member, so that claws 12 provided on an inner face of the fixing member invade into a gap between strands of the cores 2. As a result, the cores 2 are fixed in a shape. A plurality of strands 50 consisting of the electric heater 5 are pressed in points or lines and the electric heater 5 comes into contact with the cores 2 through a number of positions joining them electrically. A principle of connection between the electric heater 5 and the cores 2 is shown in FIG. 8. As apparent from FIG. 8, a plurality of strands 50 constituting the electric heater 5, respectively come into contact with the cores 2 through multi-point and they are electrically connected firmly. After that, the insulator 9 is extruded and plastic-molded so as to cover these cores 2. If necessary, a shield 10 such as a braided fiber or a stainless sheath is applied thereon to protect them.

Figure 9:
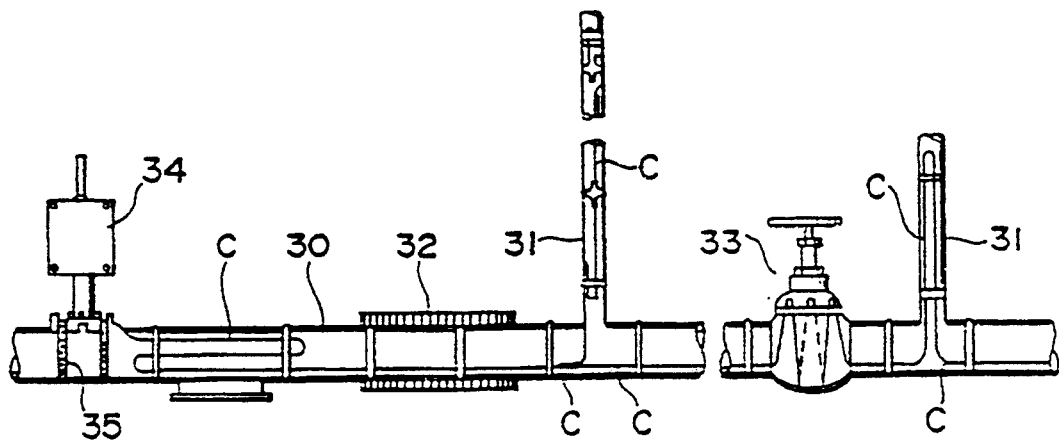
FIG. 9 is a view of the electric heating cable of the first embodiment which is used according to the present invention.

The electric heating cable C manufactured according to the present invention is used in an installation of, for example, an oil plant as shown in FIG. 9.

As shown in FIG. 9, a main pipe 30 through which a fluid flows has a branch pipe 31, a heat insulator 32 provided on a part of the main pipe 30, and a manual control valve 33, and also a power box 34 and a band 35 for fastening the power box 34. The electric heating cable C according to the present invention is adapted to be arranged along the main pipe 30 as shown. The cable C has a branch portion separated from a suitable branch point c and extends into the branch pipe 31. In particular, the electric heating cable C is turned twice or triple on the manual control valve 33 to strengthen a heating effect thereon. When an AC voltage is impressed from the power box 34 to the electric heating cable C, the strands 50 of respective braids of the electric heater 5 is heated by a Joule effect. Consequently, the fluid flowing through the interior of the main pipe 30 and the branch pipe 31 or the manual control valve 33 is heated by the hot electric heater 5 and the temperature of the fluid is detected by a temperature detector (not shown) in order to adjust the fluid flowing through the main pipe 30 and the branch pipe 31 at a fixed temperature.

Figure 10:
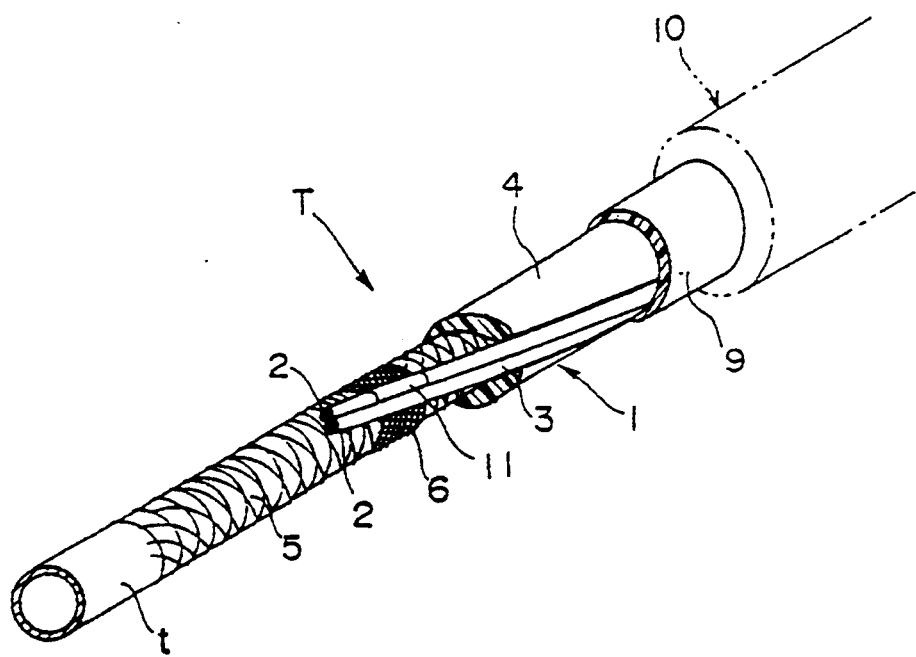
FIG. 10 is a view of the second embodiment in use according to the present invention.
Figure 11:
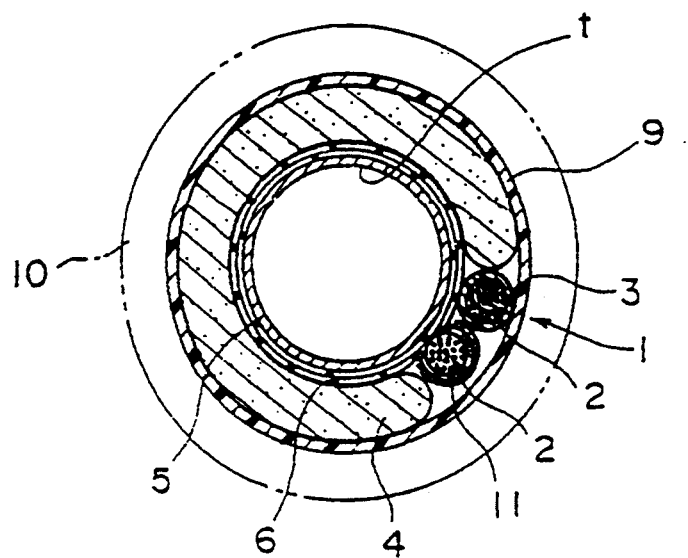
FIG. 11 is a sectional view of a part of the arrangement shown in FIG. 10.
Figure 12:
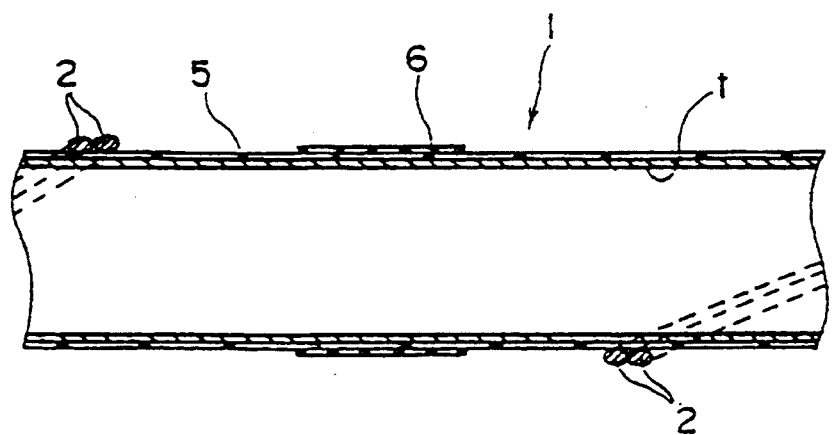
FIG. 12 is a longitudinal sectional view of the heating tube shown in FIG. 10.
Figures 13A, 13B, 13C:
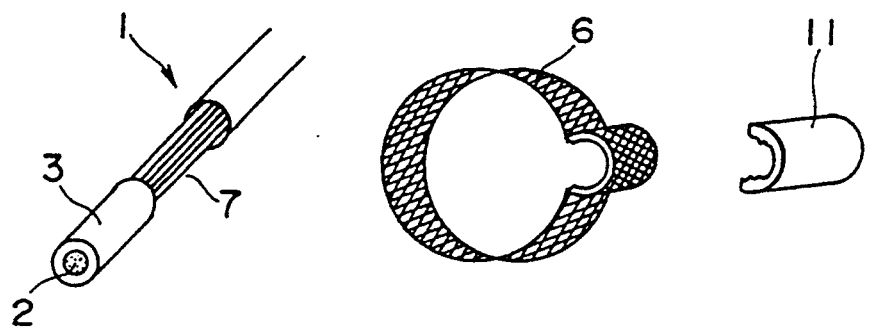
FIG. 13(A), 13(B) and 13(C) are exploded views of the connection of the joint.
Figure 14:
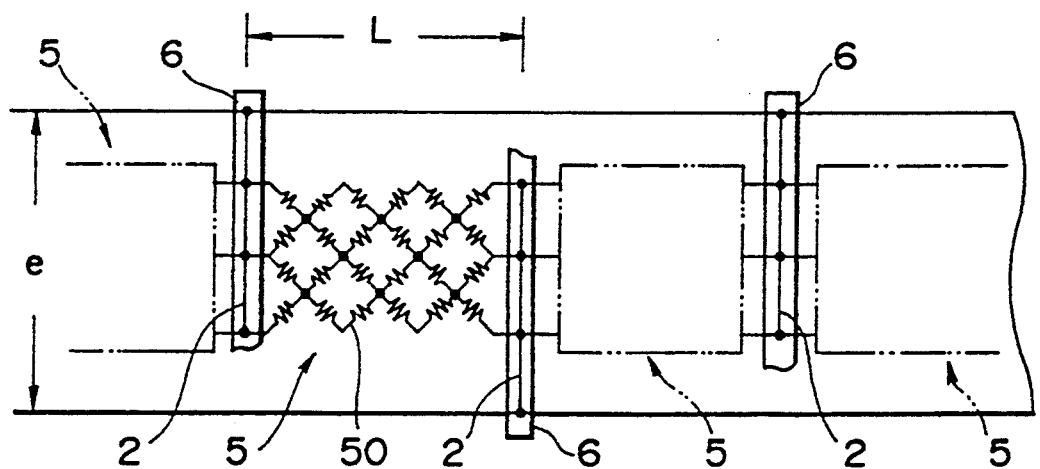
FIG. 14 is a schematic diagram of the heating tube shown in FIG. 10.

FIG. 10 is a construction explanation of the heating tube according to the second embodiment of the present invention, FIG. 11 is a section showing a part of FIG. 10, FIG. 12 is a longitudinal explanation of the heating tube shown in FIG. 10, FIG. 13(A), 13(B) and 13(C) are exploded explanation of connection of a joint, and FIG. 14 a primitive layout of electricity of the heating tube shown in FIG. 10. FIG. 10 shows a heating tube T having a central tube t making a fluid flown therethrough.

In FIGS. 10 and 11, the central tube t is a fluoric resin tube or an insulation-treated metal tube. The heating tube T has a feeder line 1, two cores 2 for the feeder line 1, an insulator 3 covering both the cores 2, and another insulator 4 filling the gap or space generated by existence of the feeder line 1 and making the whole section of the tube T circular. Also, the heating tube T has the electric heater 5 of a braid arranged around the tube t, a joint 6, and the exposed portion 7 of the two cores 2. The cores 2 and the electric heater 5 are joined through the exposed portion 7 (see FIGS. 10–13(C)).

The exposed portion 7 is formed mutually in the two cores 2 wound around the tube t in a large spiral at a fixed interval L and the joint 6 is fixed to the exposed portion 7. The insulator 4 and the feeder line 1 are covered with an insulator 9, which is further covered with a shield 10. The material used to make the cores 2, the insulators 3 and 4, the electric heater 5 is the same as the corresponding parts of the first embodiment of the present invention. Therefore, as shown in FIG. 10, the tube t, the feeder line 1, and the electric heater 5 and the other parts construct the heating tube T.

The heating tube T above is manufactured by, for example, the following steps.

First, the insulator 3 is laid around the cores 2 making a covered conductor 1. The two covered conductors 1 are arranged side-by-side and a two-core feeder line 1 is obtained. Portions of the insulator 3 at a regular interval L are mutually cut out. A circumferential part of the insulator 3 is cut to expose a part of the cores 2 forming the exposed portion 7 having a predetermined width.

Meanwhile a braid of the resistance line is arranged around the tube t to form the electric heater 5 covering the tube t. The feeder line 1 is then wound in a large spiral around the wrapped tube along the longitudinal direction of the tube. In order to secure the electrical contact between the electric heater 5 and the two cores, a joint 6 which has a braided structure with the substantially same width as that of an exposed portion is applied over the braided electric heater across each of the exposed portions 7 as shown in FIGS. 11 to 13. Similar to the case shown in FIG. 7, a C shape fixing piece 11 covers the exposed portion 7 and an open portion of the fixing piece 11 is pushed from both the sides of the C shape fixing piece 11, thereby the claws 12 formed on the inner face of the fixing piece 11 invade fixedly into the gap between strands of the cores 2. As a result, midportion of the ring-like joint 6 is squeezed as shown in FIG. 13(B) and a plurality of strands 50 constructing the electric heater 5 are pushed and come into contact forcibly against the cores 2. In detail, due to such pressing, the joint 6 is certainly fixed on the cores 2 and the electric heater is electrically connected through the joints 6 and exposed portions 7 to the feeder line 1. The schematic connection of the electric heater 5 and the cores 2 is shown in FIG. 14. In this case, a plurality of strands 50 as shown constructing the electric heater 5 come into contact with the cores 2 through multi-point forming a complicated parallel circuit. Then, the gap left by two feeder lines 1 wound in a large spiral around the tube t is filled by the insulator 4. The deformed section of the assembly is made neat in a circle. After the section controlling step, the cover 10 covers the insulator 4 and the joint 6 and other parts so as to obtain the heating tube T.

It is noted that it is possible to construct the heating tube by further providing a protective shield 10 on the insulator 9 as shown in FIG. 11 by two-dot chain line.

Figure 15:
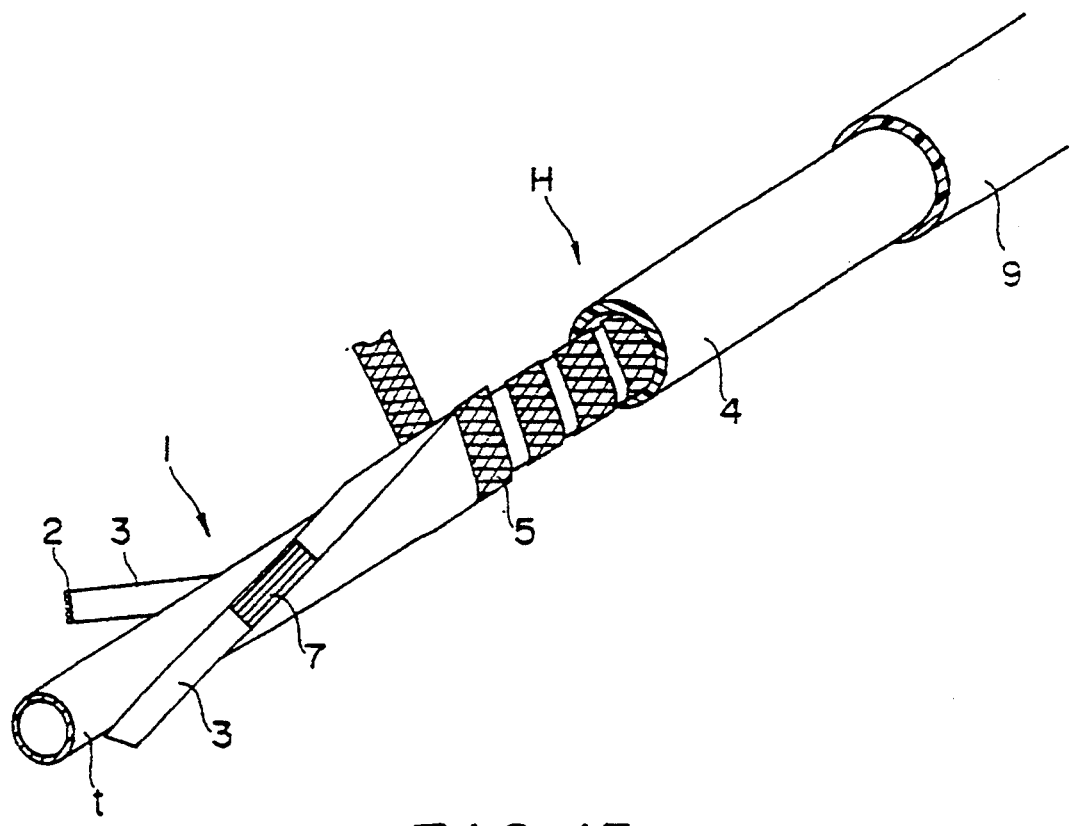
FIG. 15 is a view of another heating tube to which the present invention is applied.
Figure 16:
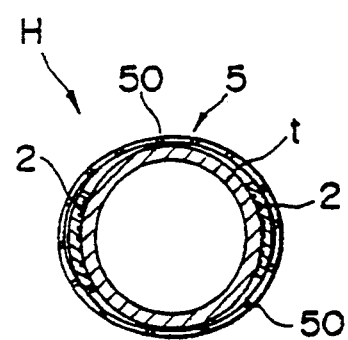
FIG. 16 is a sectional view of a part of the arrangement depicted in FIG. 15.

FIG. 15 is a construction explanation of a usage of another heating tube according to the present invention. The heating tube H shown in FIG. 15 differs from that shown in FIG. 10 only in the structures of the feeder line 1 and the electric heater 5. As shown, the feeder line 1 and the electric heater 5 use a plurality of strands 50 to form a flat braid. It is possible to omit the core 51 from the braided band-like electric heater 5 similar to the cases shown in FIG. 3(A), 3(B) and FIG. 4(A) and 4(B). As shown in FIG. 15, according to the embodiment of the present invention, two flat cores 2 having the exposed portion 7 of the feeder line 1 are wound in a large spiral at a distance of about 180 degree as shown or in a side-by-side relation around the outer periphery of the tube t. The electric heater 5 of a flat braid is laid thereon spirally. Then similar to the embodiment of FIG. 10, the insulators 3 and 4 are plastic- molded and the cover 10 is provided thereon. According to the construction of the embodiment shown in FIG. 15, the feeder line 1 and the electric heater 5 are both formed in flat, so that it is possible to obtain the compact heating tube H.

Such heating tube H is used as a conduit of electric heating sustaining fluid and of gas analyzer, and as a medical tube which is arranged on the medical installation and the like. When a voltage is impressed to two cores 2 of the heating tube H installed, a current is flown to the electric heater 5 through the joint 6 generating a Joule heat. The Joule heat generated in the electric heater 5 is transferred to the tube t, thus a liquid or gas in the tube t is heated or sustained at a fixed temperature.

Meanwhile, the electric heater 5 according to the embodiments described above consists of strands 50 of resistance wires such as nickel chrome wires.

However, it is possible to employ the wires made of self control type material, such as a conductive polymer or semiconductive polycrystal ceramic, carbon fiber wires, or a mixture of carbon fiber wires and conventional resistance wires for the stands. Although an example of a feeder line with two cores for use by a single phase AC is shown above, it is also possible to use a feeder line with three cores for use by a three phase AC.

Although an example of the electric heater 5 consisting of a plurality of resistance wires was exemplified and explained, it is possible to use a braid of a single wire, of a carbon fiber, or a carbon fiber and ceramic material and plastics, or of a normal metal resistance wire and a carbon fiber. In addition insulators 3 and 4 or an insulator covering a metal tube for a central tube t may be made of a glass fiber, a ceramic fiber or a polyamide film. An electric heater suitable to a high temperature can be provided by constructing heat resisting insulators in the shape of a sheath. Although a case of two cores being used and a voltage being impressed thereon has been explained, it is possible to use three cores, a three-phase AC being impressed thereto.

In short, the electric heater of the present invention connected to the feeder line so as to generate a Joule heat is constructed by a braid of a plurality of strands of resistance wires, respectively connected to the feeder line through a number of points.

Consequently, according to the present invention, it is possible to obtain an electric heater having a wide usage range of temperature without trouble in operation.

The heating tube and electric heater of the present invention has a braided structure connected in an arrangement to provide a number of multiple resistance circuits in parallel in a zone between each of the adjacent exposed portions of the cores. Consequently, even when a part of strands in the heater is broken because of externally applied mechanical force or cyclic changes of temperature during heating, a complete failure in generating heat in the zone to which the broken part pertains hardly happens. In addition, since the braid-structured electric heater is connected to the feeder line at each of exposed portions of the cores having many contact points, poor contact between the heater and the feeder line at the exposed portion is prevented. Further, the joint in the braided structure is electrically connected to the cores using a fixing piece with claws which presses the joint to the core at each exposed portion to secure the connection between the joint and the feeder line. Accordingly, any difference in temperature along the tube is eliminated and the fluid flowing in the tube is heated at a constant temperature. Further, the electric heater according to the present invention can be suitably used to sustain a temperature at the range from middle level (50° C.–120° C.), because the generated heat is distributed over the number of strands of a braided structure when the electric heater generates heat. When the braided electric heater is made of a heat resisting material, it is possible to provide a heating tube with an electric heater durable to high temperature.

What is claimed is:

1. A heated tube comprising:
an electrically insulative tube through which a fluid may flow; an electrical feeder line having a plurality of electrically conductive cores which are arranged along the longitudinal direction of said tube, insulation means covering each of said cores and having exposed portion for exposing each core along the length thereof at regular spaced apart intervals and in such an arrangement that said exposed portions along any one core are longitudinally offset from the exposed portions of other cores; an electric heater constructed of bare strands having an electric resistance braided directly on said tube into a tubular braid structure arranged along the longitudinal direction of said tube with said braid structure being connected to said cores of the feeder line through said exposed portions to form resistance circuits between adjacent exposed portions and adapted to generate a Joule heat during a current flowing through the cores of said feeder line in order to heat the fluid to be heated; and an insulator covering said feeder line and said electric heater around said tube.

2. A heated tube according to claim 1, further comprising a conductive braid structured joint would around said exposed portions of the cores of the feeder line for electrically connecting said electric heater to said cores.

3. A heated tube according to claim 2, further comprising a fixing piece provided with claws for forcibly griping said structured joint in order to electrically connect said electric heater to said cores.

* * * * *